(12) United States Patent
Kim et al.

(10) Patent No.: US 7,657,027 B2
(45) Date of Patent: Feb. 2, 2010

(54) PORTABLE TERMINAL WITH HINGE APPARATUS

(75) Inventors: Jong-Yang Kim, Seoul (KR); Myoung-Hoon Park, Goyang-si (KR); Soo-Ik Jung, Seoul (KR); Kyeong-Won Lim, Seoul (KR)

(73) Assignees: Samsung Electronics Co., Ltd., Suwon-si (KR); JMC Co., Ltd, Inchon (KR)

( * ) Notice: Subject to any disclaimer, the term of this patent is extended or adjusted under 35 U.S.C. 154(b) by 322 days.

(21) Appl. No.: 11/845,952

(22) Filed: Aug. 28, 2007

(65) Prior Publication Data
US 2008/0199002 A1  Aug. 21, 2008

(30) Foreign Application Priority Data
Feb. 21, 2007  (KR) ............... 10-2007-0017436
Apr. 27, 2007  (KR) ............... 10-2007-0041499

(51) Int. Cl.
*H04M 1/00* (2006.01)
*H04M 9/00* (2006.01)
(52) U.S. Cl. ............... 379/433.13; 455/575.3
(58) Field of Classification Search ............ 379/433.01, 379/433.11–433.13; 455/575.1, 575.3, 90.3; 16/367, 334; 361/679.26, 679.27
See application file for complete search history.

(56) References Cited

U.S. PATENT DOCUMENTS
2006/0238962 A1* 10/2006 Son et al. ............... 361/679

FOREIGN PATENT DOCUMENTS
KR  100630139 B1  9/2006

* cited by examiner

*Primary Examiner*—Tuan D Nguyen
(74) *Attorney, Agent, or Firm*—Jefferson IP Law, LLP

(57) ABSTRACT

A portable terminal with a hinge apparatus is provided. The portable terminal includes a hinge apparatus which pivotally couples a pair of housings together. The hinge apparatus provides a first hinge axis and a second hinge axis which are perpendicular to each other. The hinge apparatus includes a first hinge shaft coupled to the first housing along the first hinge axis, a second hinge shaft coupled to the second hinge housing along the second hinge axis and rotating about the first hinge axis and the second hinge axis, a stopper slot formed on an outer circumferential surface of the first hinge shaft along the first hinge axis, a stopper groove formed on the second hinge shaft along a circumference thereof and encompassing a part of the outer circumferential surface of the first hinge shaft, and a stopper rib formed within the stopper groove and selectively engaging with the stopper slot. Thus, when one of the housings is rotated about one of the hinge axes, the housing is restricted from rotating about the other hinge axis.

21 Claims, 14 Drawing Sheets

PORTABLE TERMINAL WITH HINGE APPARATUS

PRIORITY

This application claims the benefit under 35 U.S.C. § 119 (a) of Korean patent applications filed with the Korean Intellectual Property Office on Feb. 21, 2007 and assigned Serial No. 2007-17436, and on Apr. 27, 2007 and assigned Serial No. 2007-41499, the entire disclosures of which are hereby incorporated by reference.

BACKGROUND OF THE INVENTION

1. Field of the Invention

The present invention relates to a portable terminal. More particularly, the present invention relates to a portable terminal with a hinge apparatus which pivotally couples a pair of housings to each other and provides two hinge axes that are different from each other.

2. Description of the Related Art

In general, portable terminals may be classified into a bar-type terminal, a flip-type terminal and a folder-type terminal according to appearances thereof.

The bar-type terminal has a single body housing, on which data input/output units and transmitter/receiver units are arranged. Thus, this terminal is always exposing a keypad which is its data input unit, thereby being likely to be operated erroneously. Also, because a distance between the transmitter unit and receiver unit must be maintained, there is a limitation in making the bar-type terminal compactly.

The flip-type terminal has a body, a flip and a hinge module coupling the body and the flip together. In the flip-type terminal, the body has data input/output units and transmitter/receiver units arranged thereon and the flip covers a keypad used as the data input unit, thereby preventing the erroneous operation. However, this terminal is also subject to a limitation for a compact size of the terminal, because a distance between the transmitter unit and receiver unit must be maintained too.

The folder-type terminal has a body, a folder, and a hinge module pivotally coupling the body and the folder together. The folder-type terminal is opened and closed by rotating the folder, thereby preventing the erroneous operation of a keypad in standby mode in which the folder is folded onto the body. Also, the folder is unfolded in a calling mode so as to provide a sufficient distance between the transmitter unit and receiver unit. Thus, the folder-type terminal has a beneficial advantage for compactness. For this reason, the folder-type terminal gradually becomes popular.

Meanwhile, in order to meet various user preferences, a sliding-type terminal and a swing-type terminal have appeared. In particular, the sliding-type terminal is becoming more popular than the folder-type terminal.

However, since conventional portable terminals have developed to have an appearance suitable for a communication function such as a voice call, text message transmission, etc., they are inconvenient for multimedia services. For example, since the conventional portable terminals have a display device typically set to be vertically long, it is inconvenient for users to watch digital multimedia broadcasting (DMB), motion picture files, etc with them.

SUMMARY OF THE INVENTION

An aspect of the present invention is to address the above-mentioned problems and/or disadvantages and to provide at least the advantages described below. Accordingly, an aspect of the present invention is to provide a portable terminal with a hinge apparatus which may be used conveniently for not only communication functions but also multimedia services such as watching broadcastings.

Also, another aspect of the present invention is to provide a portable terminal with a hinge apparatus having two axes, which provides a first hinge axis and a second hinge axis, which enables a housing to be opened and closed in two directions so as to improve convenience.

In accordance with an aspect of the present invention, a portable terminal including a first housing and a second housing pivotally coupled to the first housing so that the second housing may be unfolded from and folded onto the first housing is provided. The portable terminal includes a hinge apparatus for providing a first hinge axis and a second hinge axis perpendicular to each other and for coupling the first housing and the second housing together. The hinge apparatus includes a first hinge shaft coupled to the first housing along the first hinge axis, a second hinge shaft coupled to the second hinge housing along the second hinge axis and rotating about the first hinge axis and the second hinge axis, a stopper slot formed on an outer circumferential surface of the first hinge shaft along the first hinge axis, a stopper groove formed on the second hinge shaft along a circumference thereof and encompassing a part of the outer circumferential surface of the first hinge shaft, and a stopper rib formed within the stopper groove and selectively engaging with the stopper slot, wherein when the second housing is rotated about the first hinge axis to be unfolded, the stopper rib interferes with the outer circumferential surface of the first hinge shaft, thereby restricting the second housing from rotating about the second hinge axis, wherein when the second housing is rotated about the second hinge axis to be unfolded, the stopper rib is engaged with the stopper slot, thereby restricting the second housing from rotating about the first hinge axis.

In accordance with an aspect of the present invention, a first housing and a second housing are pivotally coupled to each other, in which the second housing is selectively rotated about a first hinge axis or a second hinge axis to be unfolded from a folded state on the first housing.

In accordance with an aspect of the present invention, a hinge apparatus is provided. The hinge apparatus, by which first and second housings are pivotally coupled to each other, has a first hinge shaft and a second hinge shaft. The first hinge shaft is coupled to the first housing along a first hinge axis and a second hinge shaft is coupled to the second housing along a second hinge axis. At this time, the second hinge shaft is rotated about either the first hinge shaft or the second hinge axis, thereby enabling the second housing to rotate about either the first hinge shaft or the second hinge axis.

In accordance with an aspect of the present invention, the first hinge shaft has a stopper slot and the second hinge shaft has a stopper rib, so once the second housing has been rotated about one of the first hinge axis and second hinge axis, the second housing is restricted from rotating about the other hinge axis. Consequently, the second housing may be rotated about one of the first and second hinge axis only when folded on the first housing. That is, when rotated about one of the first hinge axis and second hinge axis to be away from the first housing, the second housing cannot be rotated about the other hinge axis.

In accordance with an aspect of the present invention, the second hinge shaft has a stopper groove on an outer circumferential surface thereof, which is formed along a circumference of the second hinge shaft. The stopper groove encompasses a part of the outer circumferential surface of the first hinge shaft, thereby preventing the second hinge shaft from escaping toward the direction of the second hinge axis.

BRIEF DESCRIPTION OF THE DRAWINGS

The above and other exemplary features, aspects, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, detailed descriptions of well-known functions and configurations incorporated herein are omitted for clarity and conciseness.

Figure 1:
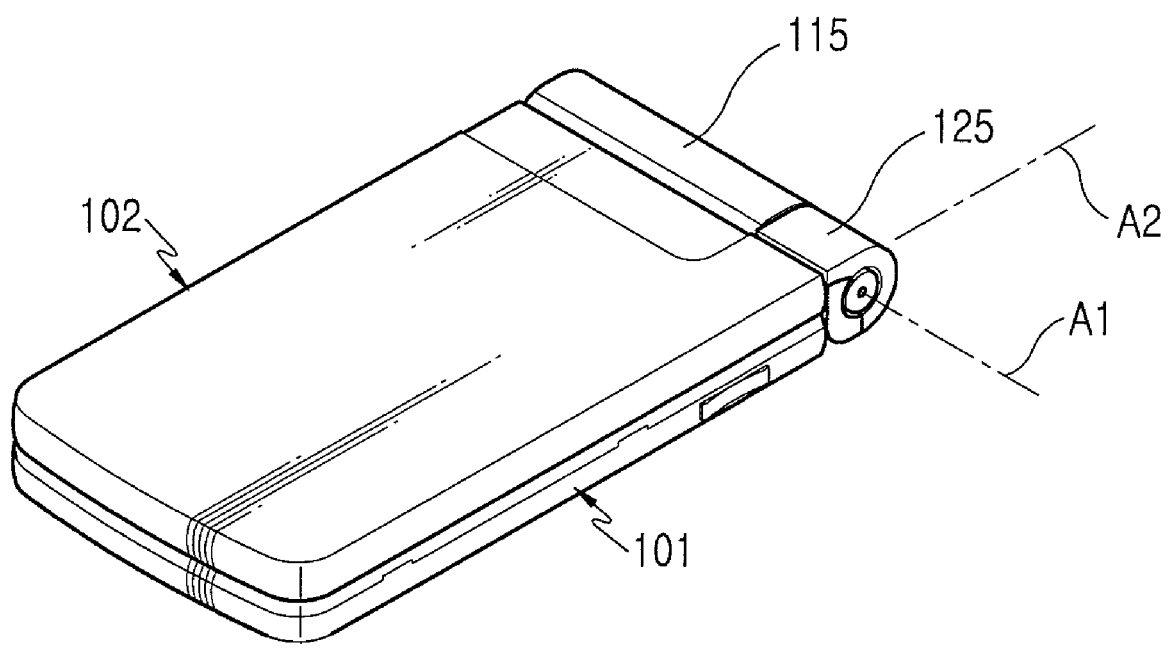
FIG. 1 is a perspective view illustrating a portable terminal with a hinge apparatus according to an exemplary embodiment of the present invention.
Figure 2:
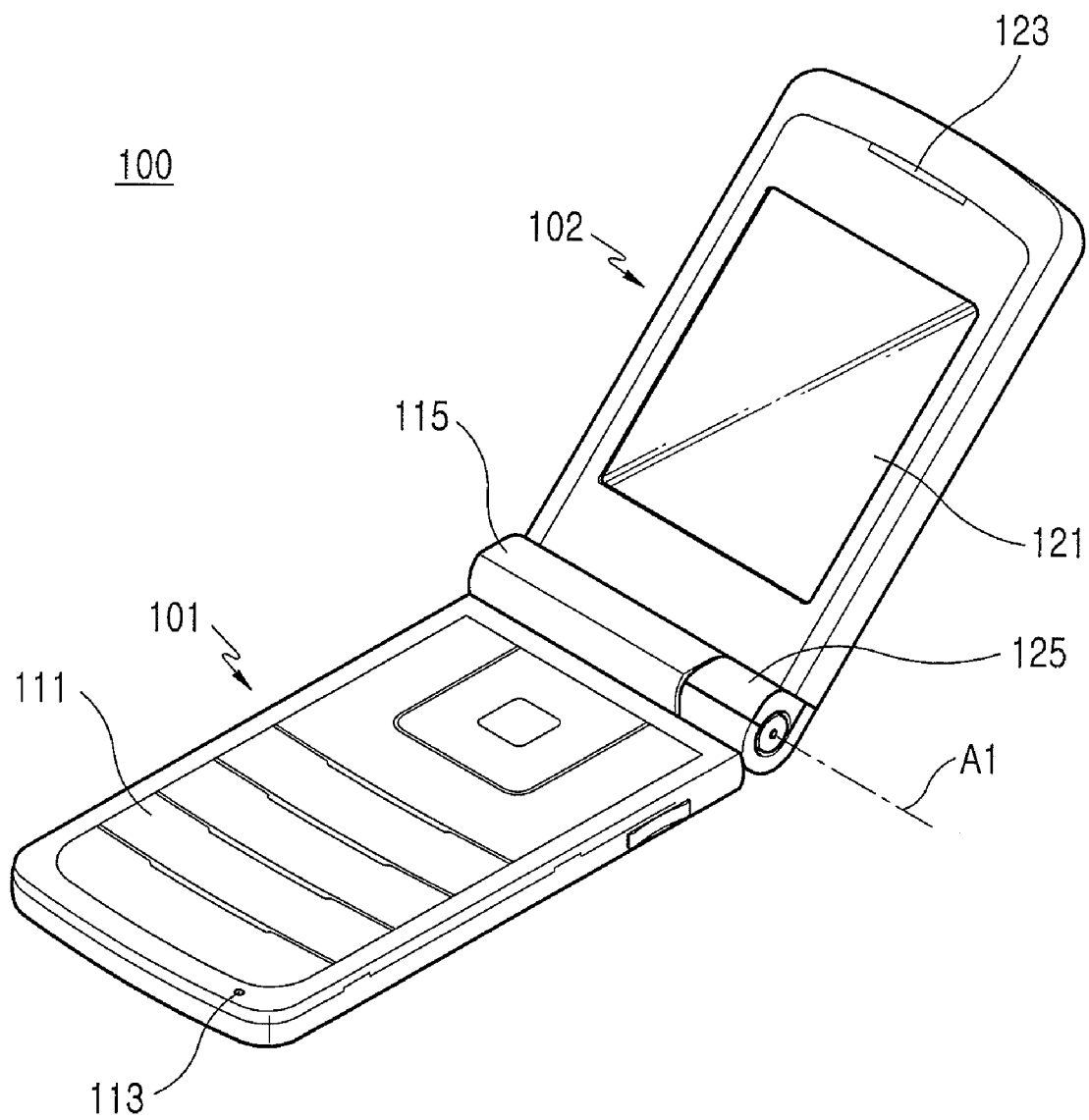
FIG. 2 is a perspective view illustrating the portable terminal of FIG. 1 in a state that a second housing is rotated about a first hinge axis to be unfolded.
Figure 3:
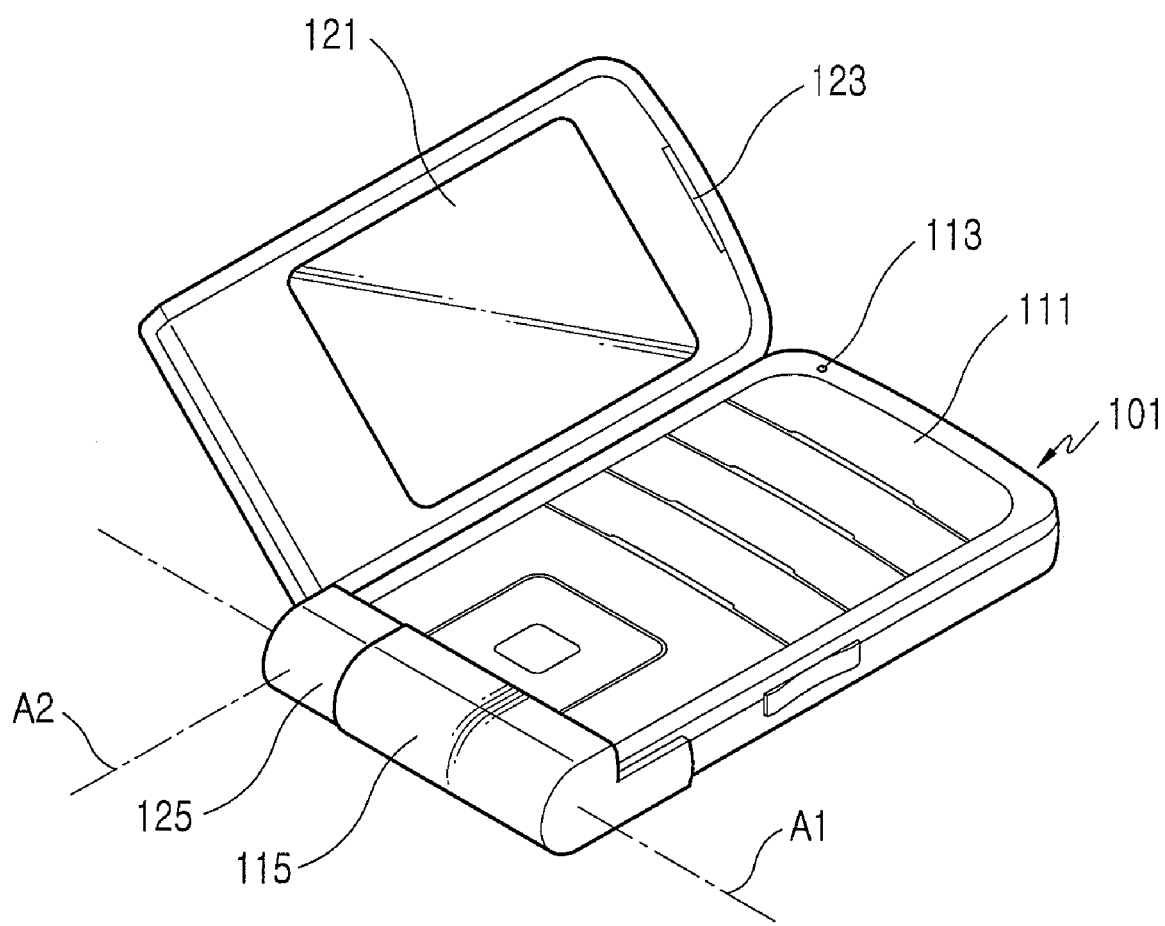
FIG. 3 is a perspective view illustrating the portable terminal of FIG. 1 in a state that the second housing is rotated about a second hinge axis to be unfolded.

As shown in FIGS. 1 to 3, a portable terminal 100 with a hinge apparatus 200 (shown in FIG. 4) according to an exemplary embodiment of the present invention includes a first housing 101 and a second housing 102, in which the second housing 102 may be rotated about either a first hinge axis A1 or a second hinge A2 perpendicular to each other.

The second housing 102 may be optionally rotated about one of the first hinge axis A1 and second hinge axis A2 only when it has been folded on the first housing 101. Once the second hosing 102 has been rotated about one of the first hinge axis A1 and second hinge axis A2 and has then been away from the first housing 101, the second housing 102 may not be rotated about the other hinge axis. This will be explained in greater detail below through a construction of the hinge apparatus 200.

The first housing 101 is a main body which receives a main board, a battery pack and the like. The first housing 101 has a key pad 111 and a transmitter unit 113 arranged on one face thereof, which are opened and closed by the second housing 102. In order to be coupled with the second housing 102, the first housing 101 has a first hinge arm 115 on an upper end portion thereof, which extends along the first hinge axis A1. The first hinge arm 115 is formed on a portion which corresponds to a part of the entire width of the first housing 101, thereby providing a place, which corresponds to the rest of the width of the first housing 101, at which, as described below, a second hinge arm 125 is arranged.

The second housing 102 has a display device 121 and a receiver unit 123, which are disposed on one face thereof. The second housing 102 has the second hinge arm 125 coupled on one end portion thereof. In an assembled state, the one end of the second hinge arm 125 is in contact with one end of the first hinge arm 115, and the second hinge arm 125 may be rotated about the first hinge axis A1. Therefore, the second housing 102 may also be rotated about the first hinge axis A1 together with the second hinge arm 125.

In a connection of the second housing 102 with the second hinge arm 125, the second housing 102 is rotatably coupled with the second hinge arm 125 about the second hinge axis A2. Therefore, in a state that the second housing 102 is folded on the first housing 101, the second housing 102 may be rotated about either the first hinge axis A1 together with the second hinge arm 125 or the second hinge axis A2 relative to the second hinge arm 125.

FIG. 2 illustrates an unfolded state in which the second housing 102 is rotated about the first hinge axis A1. FIG. 3 illustrates another unfolded state in which the second housing 102 is rotated about the second hinge axis A2.

Referring to FIG. 2, the second housing 102 is rotated about the first hinge axis A1. In this unfolded state, the portable terminal 100 has the same appearance as that of conventional folder-type terminals. Thus, in this unfolded state in which the second housing 102 is rotated about the first hinge axis A1, users may conveniently use the portable terminal 100 for performing normal mobile communication functions, for playing games and the like.

Referring to FIG. 3, the second housing 102 is rotated about the second hinge axis A2 to be another unfolded state. This unfolded state is a state that the portable terminal 100 may provide a laterally long screen in appearance. Thus, when the second housing 102 is rotated about the second hinge axis A2 to be another unfolded state, users may conveniently use the portable terminal 100 for multimedia services such as watching broadcast etc.

Hereinafter, an exemplary construction of the hinge apparatus 200 will be explained with reference to FIGS. 4 to 8.

The hinge apparatus 200 includes a first hinge shaft 205 coupled to the first housing 101 along the first hinge axis A1 and a second hinge shaft 203 coupled to the second housing 102 along the second hinge axis A2. The second hinge shaft 203 may be rotated about the first hinge axis A1 and about the second hinge axis A2 as well. When the second hinge shaft 203 is rotated about the first hinge axis A1, the second housing 102 is rotated about the first hinge axis A1. Also, when the second hinge shaft 203 is rotated about the second hinge axis A2, the second housing 102 is rotated about the second hinge axis A2.

In addition, the hinge apparatus 200 may include a hinge housing 201 and a first hinge cam 202, in order to achieve a single module including the first and second hinge shafts 205 and 203. Further, in order to provide a driving force and a stopping force for rotating or stopping the second housing 102, the hinge apparatus 200 may include a second hinge cam 204, an elastic member 206, a ball assembly, etc.

The hinge housing 201 is disposed within the first hinge arm 115 and extends along the first hinge axis A1. The hinge housing 201 may be formed into an integral structure together with the first hinge arm 115 or into a separate unit. In the drawings, the hinge housing 201 has a separate structure in consideration of the assembling of the first hinge shaft 205 and an appearance of the portable terminal 100.

The hinge housing 201 sequentially receives the elastic member 206 and the second hinge cam 204 within a hole extending inwardly from its one end surface. The first hinge shaft 205 extends sequentially through the first hinge cam 202, the second hinge cam 204, and the elastic member 206 and has a first end portion fixed to an inner portion of the hinge housing 201. A fixing hole 211 is formed in the hinge housing 201, and a pin hole 253 is formed in the first end portion of the first hinge shaft 205. A fixing pin 259 is inserted through the pin hole 253 and fixed at its both ends portion in the fixing hole 211, thereby fixing the first hinge shaft 205 to the hinge housing 201. The first hinge shaft 205 is positioned on the first hinge axis A1, thereby supporting the rotation of the first hinge cam 202 and the second housing 102 about the first hinge axis A1.

The first hinge shaft 205 has a stopper slot 251 extending along the first hinge axis A1 at a circumferential surface of a second end portion thereof. When the second housing 102 is rotated about the second hinge axis A2 to be away from the first housing 101, the stopper slot 251 is engaged with a stopper rib 237b of the second hinge shaft 203, thereby restricting the second housing 102 from rotating about the first hinge axis A1.

The first hinge cam 202 is coupled with the hinge housing 201 by the first hinge shaft 205, while being in contact with one end of the hinge housing 201. The first and second hinge shafts 205 and 203 are rotatably coupled to the first hinge cam 202 and cross each other within the first hinge cam 202.

The first hinge cam 202 has a pair of first mountain-shaped protrusions 221 at one side surface thereof, which are symmetrically located each other relative to the first hinge axis A1. In the assembled state, the first mountain-shaped protrusions 221 are disposed within the hinge housing 201.

The second hinge cam 204 is disposed within the hinge housing 201 so as to be only linearly movable. The elastic member 206 is received within the hole of the hinge housing 201 and provides an elastic force to create the second hinge cam 204 to contact and push the first hinge cam 202. Accordingly, the first hinge cam 202 is rotated about the first hinge axis A1 while rubbing against the second hinge cam 204.

Also, the second hinge cam 204 has a pair of second mountain-shaped protrusions 241 and valley-shaped portions 243, in which the second mountain-shaped protrusions 241 and the valley-shaped portions 243 are alternatively formed with each other along a circumstance of the second hinge cam 204. Therefore, in the state that the second hinge cam 204 is in contact with and pushes the first hinge cam 202 due to the elastic force of the elastic member 206, once the first hinge cam 202 begins moving along the rotation direction thereof, the first hinge cam 202 rotates toward an engaging direction of the first mountain-shaped protrusions 221 and the valley-shaped portions 243. Consequently, the elastic force of the elastic member 206 acts as a driving force for the rotation of the first hinge cam 202.

Meanwhile, in order to define the range of rotation of the first hinge cam 202 and the second housing 102 which are rotated about the first hinge axis A1, the hinge apparatus 200 has first and second stopper protrusions 219 and 229. The first stopper protrusion 219 protrudes from an outer circumferential surface of the one end portion of the hinge housing 201, and the second stopper protrusion 229 is formed to be adjacent to one of the first mountain-shaped protrusions 221. In the state that the first hinge cam 202 is assembled to the hinge housing 201, a part of the second stopper protrusion 229 is in contact with the outer circumferential surface of the one end portion of the hinge housing 201. The second stopper protrusion 229 moves along the circumferential surface of the one end portion of the hinge housing 201 in the circumference direction of the hinge housing 201 when the first hinge cam 202 is rotated.

Figure 4:
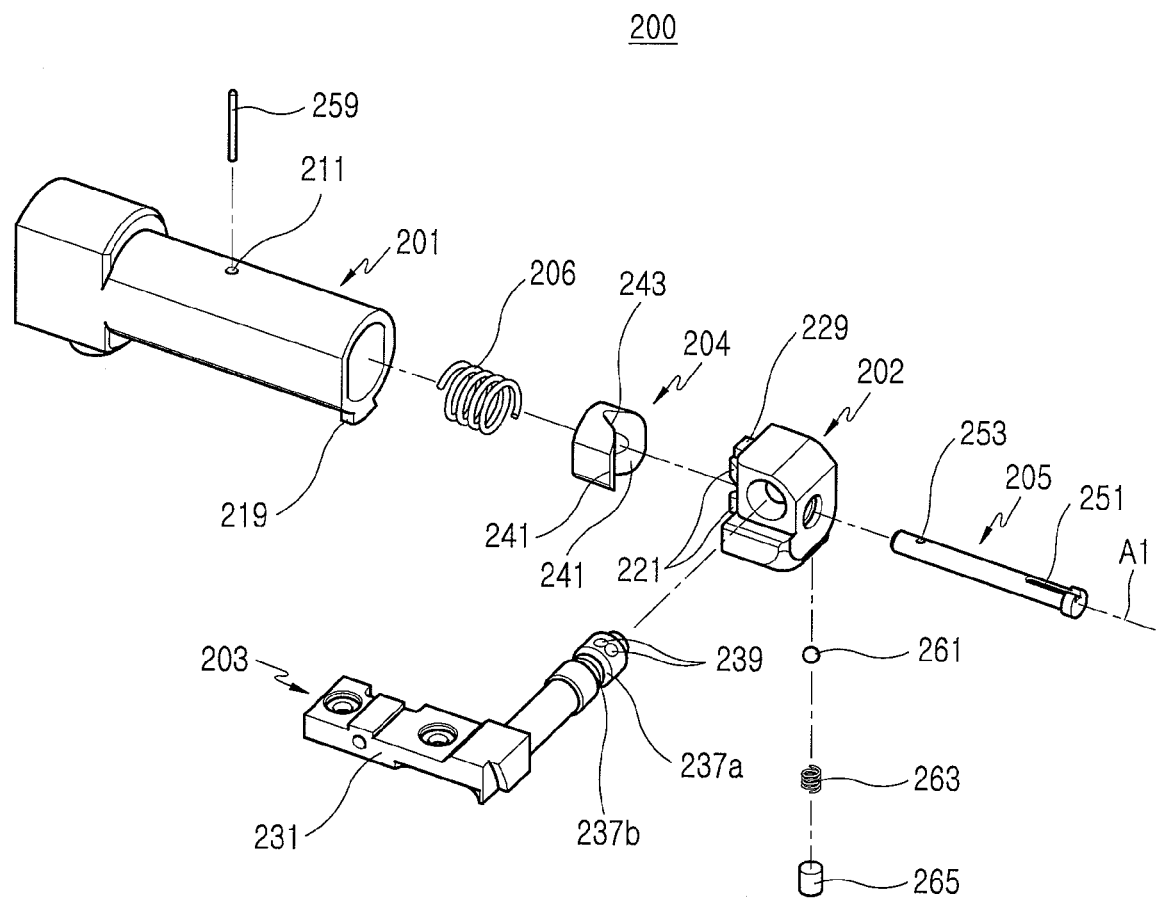
FIG. 4 is an exploded perspective view illustrating a hinge apparatus of the portable terminal of FIG. 1.
Figure 5:
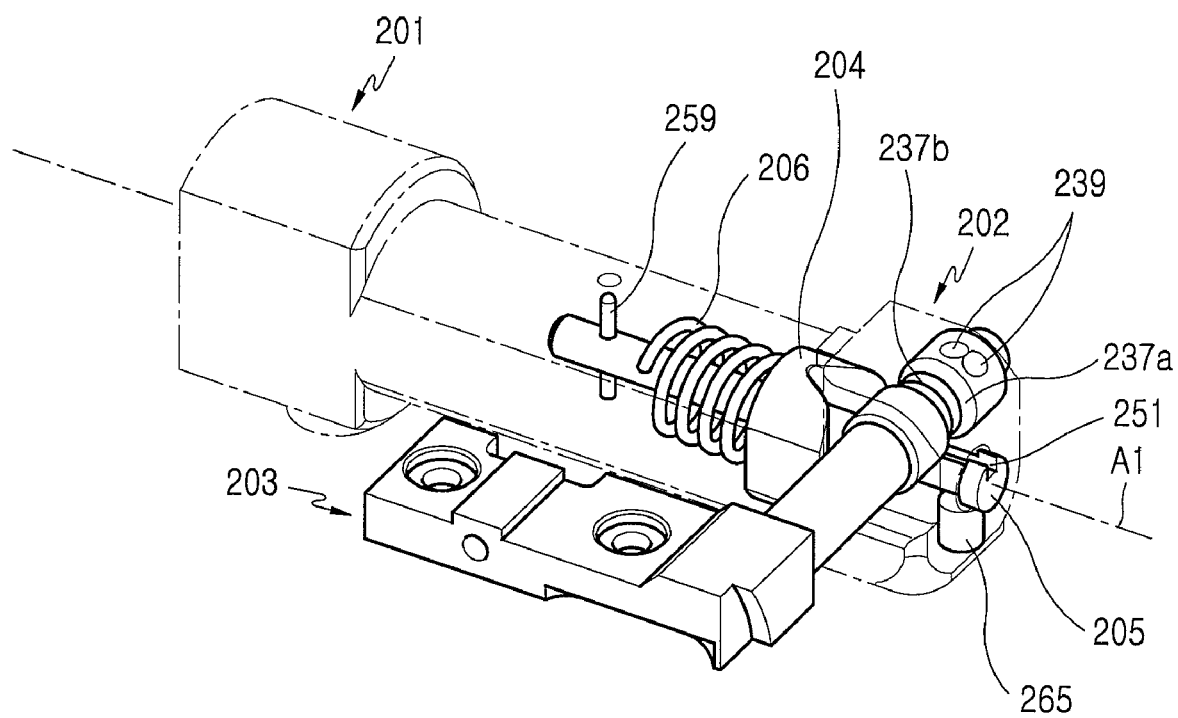
FIG. 5 is a partially transparent perspective view illustrating a hinge apparatus of the portable terminal of FIG. 1 in an assembled state.
Figure 6:
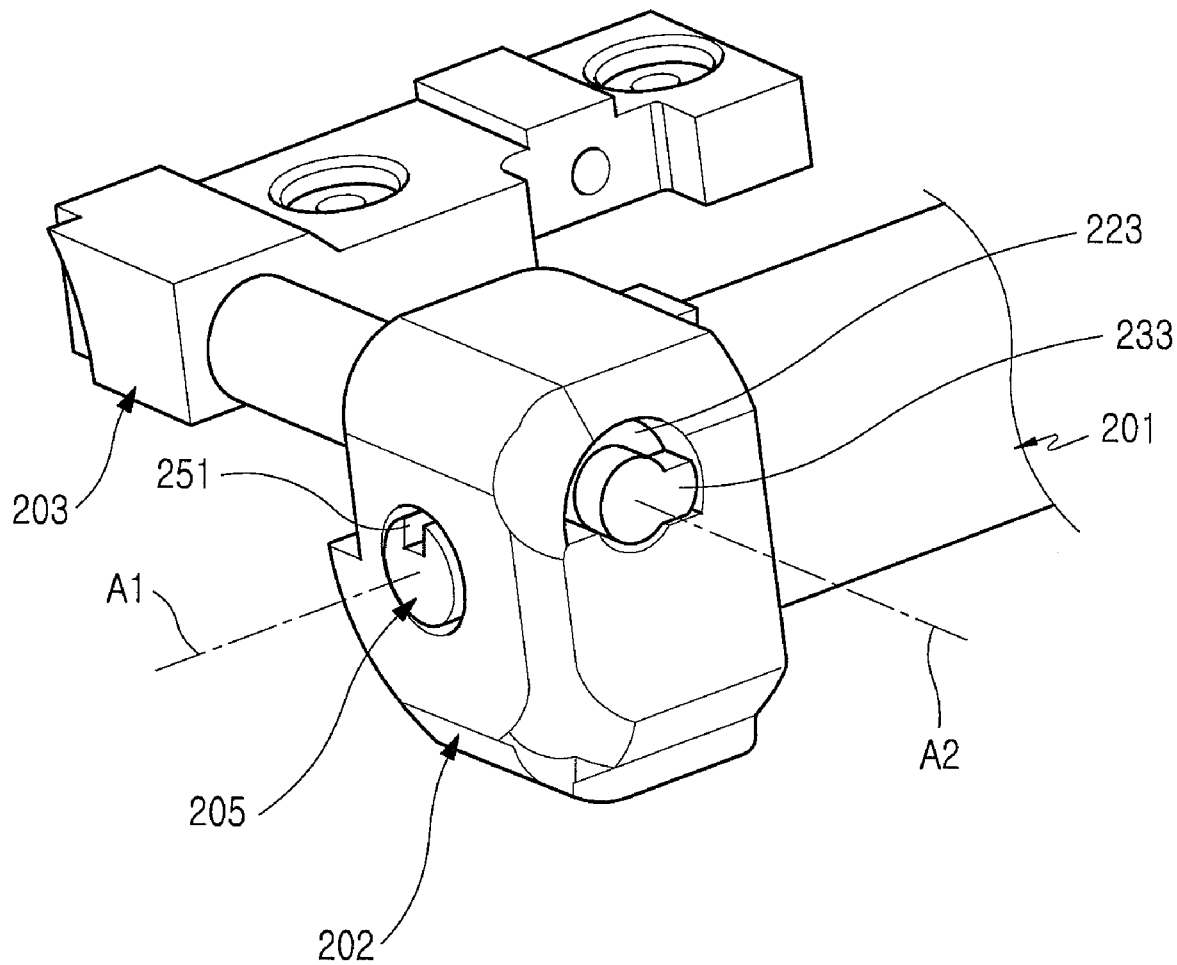
FIG. 6 is a perspective view illustrating the hinge apparatus of FIG. 5 shown from another direction.
Figure 7:
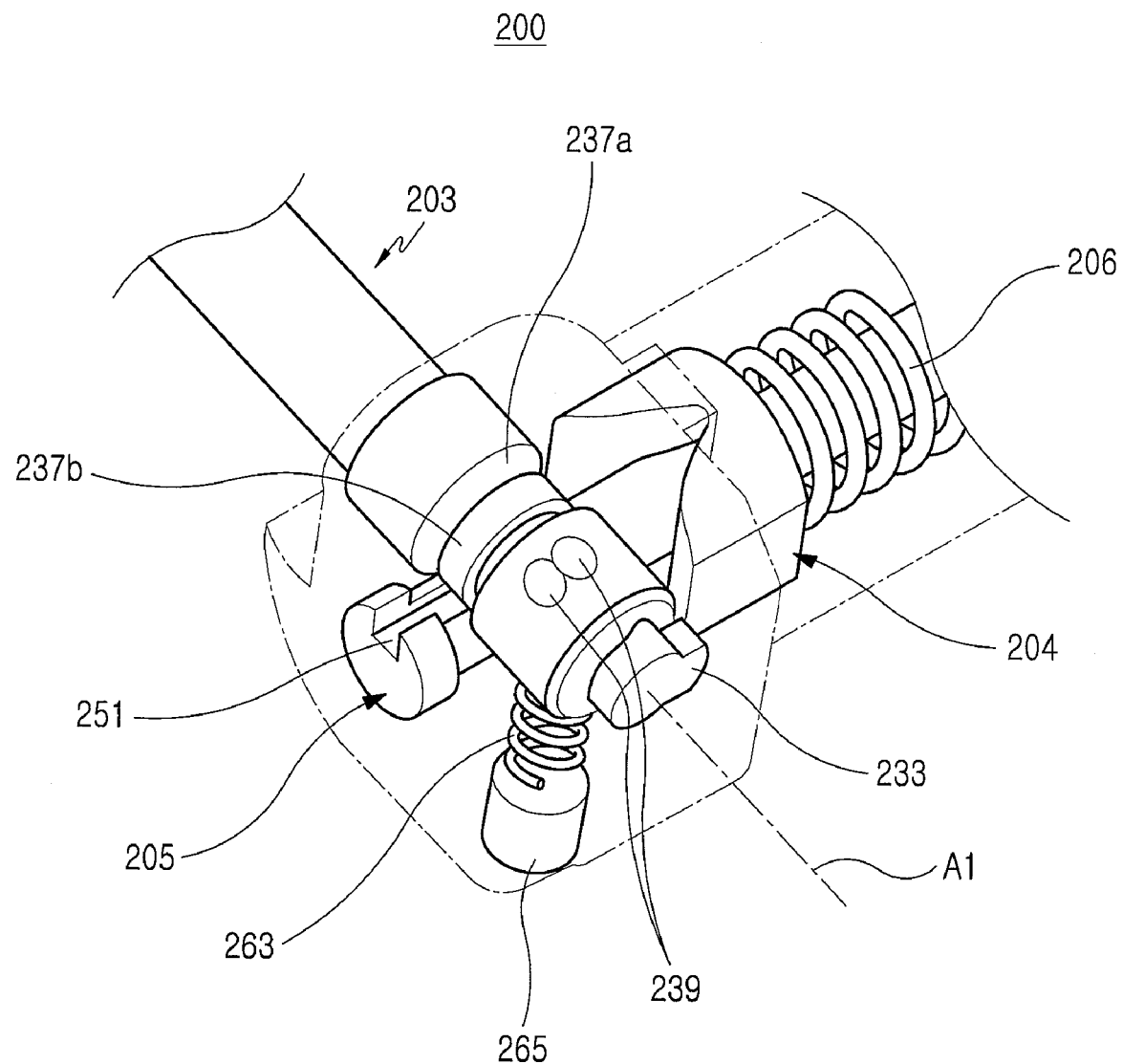
FIG. 7 is a partially transparent perspective view illustrating a part of the hinge apparatus of FIG. 5.
Figure 8:
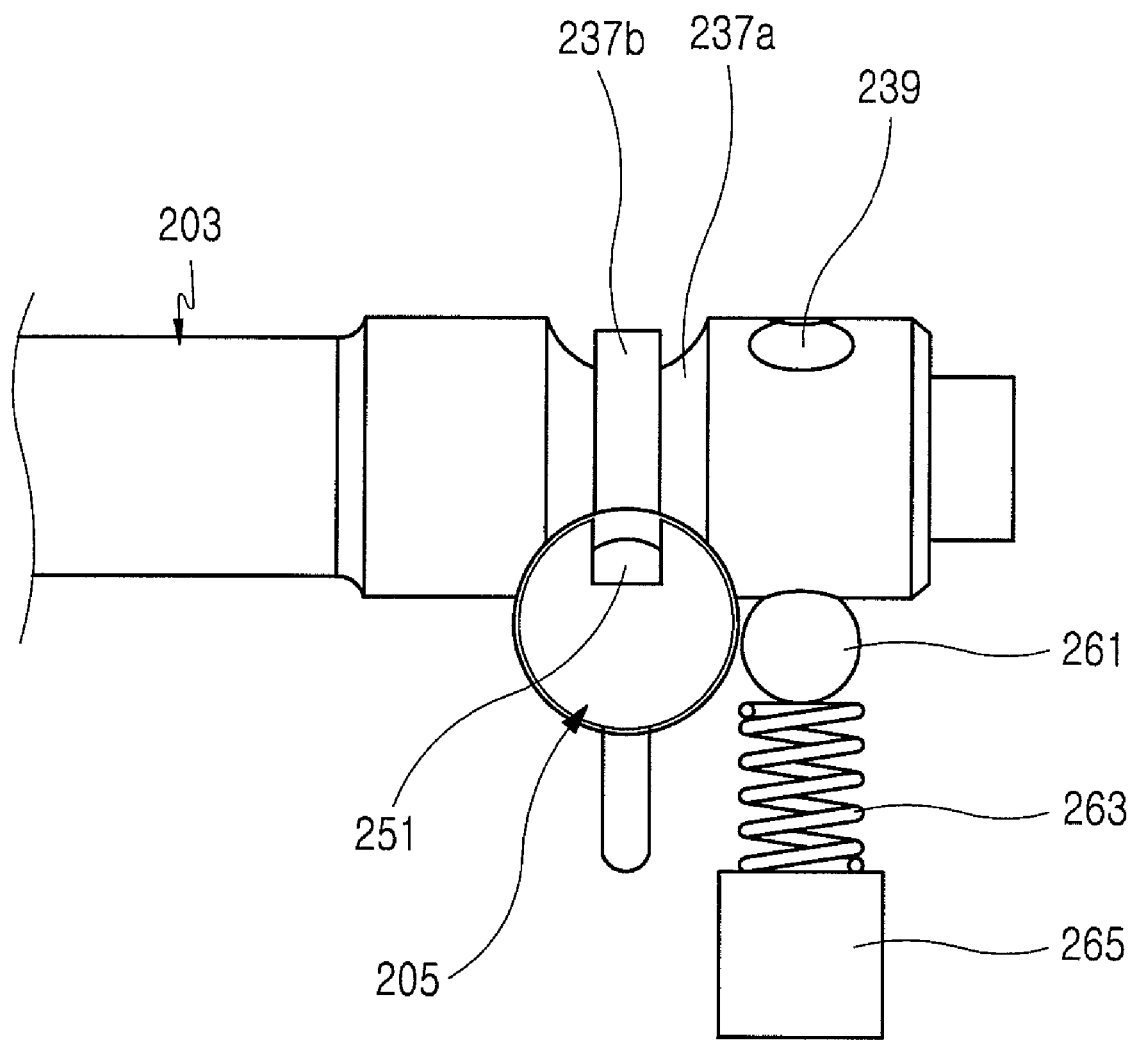
FIG. 8 is a view illustrating a ball assembly of the hinge apparatus of FIG. 5.

Considering the state shown in FIGS. 4 and 5 as the folded state in which the first and second housings 101 and 102 are folded together, the first hinge cam 202 may be rotated about the first hinge axis A1 up to an angle of about 155 to 170 degrees from the folded state. In addition, if the first and second stopper protrusions 219 and 229 are modified in their sizes and positions, the degree range of the rotation of the first hinge cam 202 may be variously changed. Consequently, the degree range of the rotation of the second housing 102 about the first hinge axis A1 may be configured according to the type of product.

The second hinge shaft 203 is fixed to the second housing 102 and located on the second hinge axis A2. The second hinge shaft 203 has a coupling piece 231 formed at a first end portion thereof, which is inserted in and fixed to the second housing 102. The coupling piece 231 has a shape that extends along a perpendicular direction to the second hinge shaft 203, and is formed at the first end portion of the second hinge shaft 203 to be an integral structure with the second hinge shaft 203. The coupling piece 231 has a plurality of holes formed thereon, where a screw and the like may be fastened, thereby providing a means capable of coupling the second hinge shaft 203 to the second housing 102.

In order to define the rotation range of the second hinge shaft 203 about the second hinge axis A2, the second hinge shaft 203 has a third stopper protrusion 233 formed at a second end portion of thereof, and the first hinge cam 202 has a guide groove 223.

The third stopper protrusion 233 protrudes from a circumferential surface of the second end portion of the second hinge shaft 203, and moves along the guide groove 223 when the second hinge shaft 203 is rotated. Here, when the third stopper protrusion 233 is stopped by a wall on one end portion of the guide groove 223, the second hinge shaft 203 may not be rotated any more. As a result, the second hinge shaft 203 is restricted from rotating and then the second housing 102 is restricted from rotating about the second hinge axis A2.

The combination of the third stopper protrusion 233 and the guide groove 223 is due to defining the range of the rotation of the second housing 102 about the second hinge axis A2 in a direction away from the first housing 101. Further, in the state that the second housing 102 is folded on the first housing 101, since the second housing 102 may be rotated only in the direction away from the first housing 101, the third stopper protrusion 233 does not necessarily have to be interfered by a wall of another end portion of the guide groove 223.

The ball assembly not only provides the second hinge shaft 203 with a friction force while rotating, but also allows the second hinge shaft 203 to stop and maintain the stop state at a predetermined position when the second hinge shaft 203 is rotated about the second hinge axis A2. The friction force or the stopping force, which is provided to the second hinge shaft 203 by the ball assembly, may restrict the second housing 102 from moving contrary to the user's intention.

The ball assembly includes at least a pair of first stopper recesses 239 formed at the circumferential surface of the second hinge shaft 203, and a metal ball 261 pressing on the circumferential surface of the second hinge shaft 203 and selectively engaging with the first stopper recesses 239.

The metal ball 261 and a spring 263 are received in a hole formed in the first hinge cam 202. The spring 263 provides an elastic force to the metal ball 261 so as to press on the circumferential surface of the second hinge shaft 203. In order to secure the metal ball 261 and the spring 263 in the hole of the first hinge cam 202, the hole is tightened and closed up with a screw 265.

The first stopper recesses 239 are formed on the surface of the second hinge shaft 203 on a route along which the ball 261 is rubbed with the surface of the second hinge shaft 203 during the rotation of the second hinge shaft 203. Therefore, the ball 261 may be engaged with one of the first stopper recesses 239 while the second hinge shaft 203 is rotating, which allows the second hinge shaft 203 and, ultimately, the second housing 102, which is rotating about the second hinge axis A2, to stop or to maintain in the stop state.

At this time, one of the first stopper recesses 239 is engaged with the ball 261 when the second housing 102 is unfolded at an angle of about 150 degrees with respect to the first housing 101, and the other one of the first stopper recesses 239 is engaged with the ball when the second housing 102 is unfolded at an angle of about 175 degrees with respect to the first housing 101. Namely, when the second housing 102 is rotated about the second hinge axis A2 so as to be unfolded at an angle of about 150 or 175 degrees with respect to the first housing 101, the ball 261 is engaged with one of the first stopper recesses 239, thereby allowing the stop state of the second housing 102 to be stably maintained.

Similarly, in order to maintain a stop state of the second housing 102 when the second housing 102 is folded on the first housing 101, the ball assembly may be provided with a second stopper recess (not shown). Namely, the second stopper recess is formed on the circumferential surface of the second hinge shaft 203, thereby engaging with the ball 261 while the first and second housings 101 and 102 are folded together.

As described above, the ball assembly allows the second housing 102 to be maintained in the stop states either while folded on the first housing 101 or when rotated about the second hinge axis A2 to be unfolded at an angle of about 150 or 175 degrees with respect to the first housing 101.

Hereinafter, a stopper slot 251, a stopper rib 237b, and a stopper groove 237a formed on the outer circumferential surface of the second hinge shaft 203 will be explained.

The stopper groove 237a is formed at the outer circumferential surface of the second end portion of the second hinge shaft 203 and extends along the circumference of the second hinge shaft 203. In the state that both the first and second hinge shafts 205 and 203 are coupled with the first hinge cam 202, the stopper groove 237a encompasses a part of the outer circumferential surface of the first hinge shaft 205.

In a process of assembling the first and second hinge shafts 205 and 203, the second hinge shaft 203 is first assembled with the first hinge cam 202, and then the first hinge shaft 205 is inserted through the first hinge cam 202. When the second hinge shaft 203 has been assembled with the first hinge cam 202, the stopper groove 237a forms a part of an inner wall of a hole where the first hinge shaft 205 is inserted.

That is, the first and second hinge shafts 205 and 203 partially overlap each other in their crossing portion where the stopper groove 237a is located so as to receive a part of the outer circumferential surface of the first hinge shaft 205. Accordingly, the first hinge shaft 205 may be assembled with the first hinge cam 202 without interference with the second hinge shaft 203, and a part of the outer circumferential surface of the first hinge shaft 205 is partially encompassed by the stopper groove 237a.

At this time, the second hinge shaft 203 has different portions adjacent to the stopper groove 237a, which interferes with the second hinge shaft 203, thereby preventing the second hinge shaft 203 from moving along the second hinge axis A2. Consequently, the first hinge shaft 203 may be rotatably held in the first hinge cam 202 without an additional fixing or coupling means.

The stopper rib 237b is formed within the stopper groove 237a and has a shape of a protrusion extending along the circumference of the second hinge shaft 203. The stopper rib 237b has a flat portion 237c with a shape of a cutaway plane at an outer circumference thereof. The flat portion 237c is in contact with the stopper slot 251 portion when the first and second housings 101 and 102 are folded together.

When the first hinge cam 202 is rotated about the first hinge axis A1 from the state that first and second housings 101 and 102 are folded together, the second housing 102 rotates to be away from the first housing 101, and the flat portion 237c also rotates about the first hinge axis A1 while being in contact with the outer circumferential surface of the first hinge shaft 205. Since the flat portion 237c is in contact with the outer circumferential surface of the first hinge shaft 205 in the state that the second housing 102 is away from the first housing 101, the flat portion 237c is interfered by the outer circumferential surface of the first hinge shaft 205 so as not to be rotated about second hinge axis A2. Therefore, when the second housing 102 is rotated about the first hinge axis A1 to be away from the first housing 101, the second housing 102 may not be rotated about second hinge axis A2 but may be rotated only about first hinge axis A1.

When the second hinge shaft 203 is rotated about the second hinge axis A2 from the state that first and second housings 101 and 102 are folded together, the second housing 102 rotates to be away from the first housing 101 and the stopper rib 237b also rotates about the second hinge axis A2 to be inserted into the stopper slot 251. As a result, the second hinge shaft 203 is held so as to be prevented from rotating about the first hinge axis A1, so the second hinge shaft 203 may be rotated only about the second hinge axis A2. Consequently, when the second housing 102 is rotated about the second hinge axis A2 to be away from the first housing 101, the second housing 102 may rotate only about the second hinge axis A2.

FIGS. 5 to 8 illustrate a hinge apparatus 200 in a state that first and second housings 101 and 102 are folded together. In the state that the first and second housings 101 and 102 are folded together, the first mountain-shaped protrusions 221 of the first hinge cam 202 are engaged with the valley-shaped portions 243, and the engaged state is maintained. At the same time, the flat portion 237c of the stopper rib 237b is in contact with the stopper slot 251 portion and the contacted state is maintained. Accordingly, when the second housing 102 is folded on the first housing 101, the second housing 102 is in a state in which the second housing 102 may be rotated about either the first or second axes A1 and A2.

Figure 9:
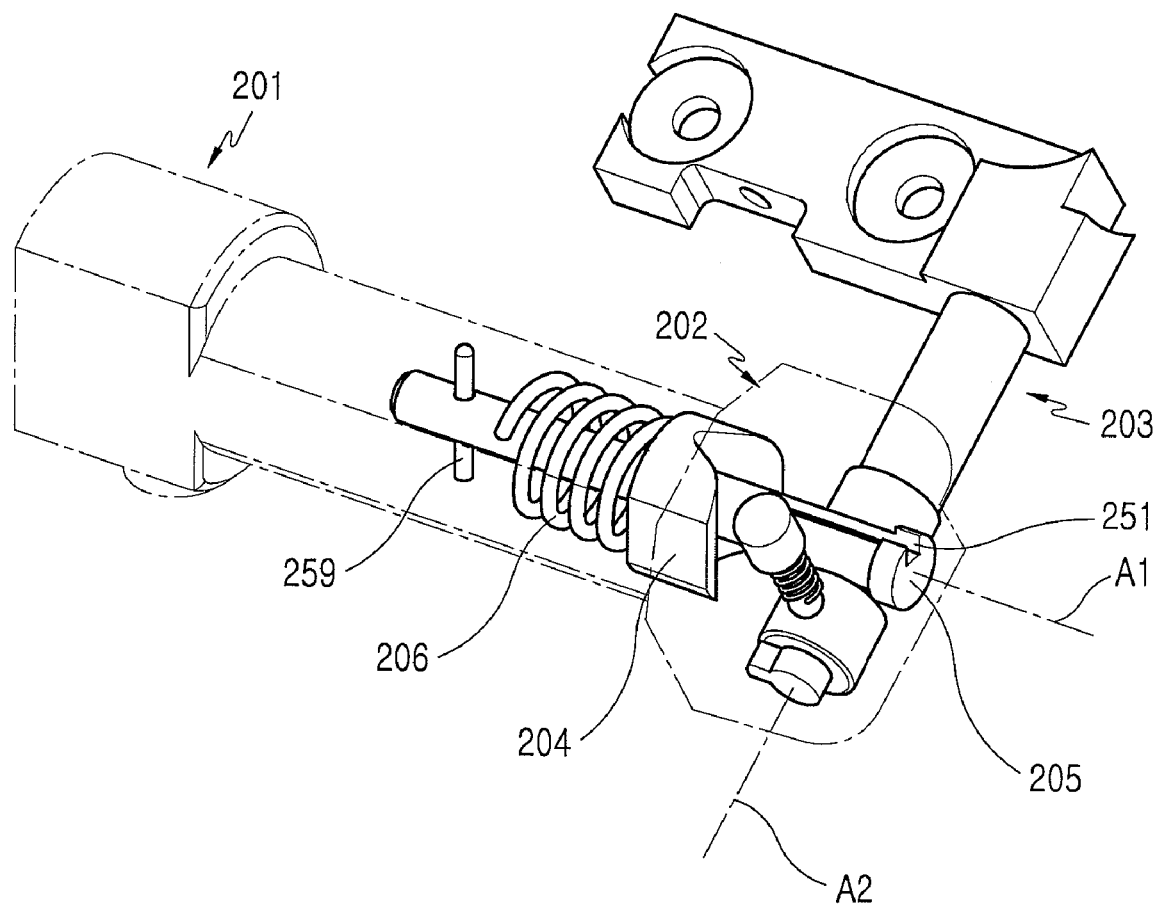
FIG. 9 is a partially transparent perspective view illustrating the hinge apparatus of FIG. 5 in which a first hinge cam is rotated.
Figure 10:
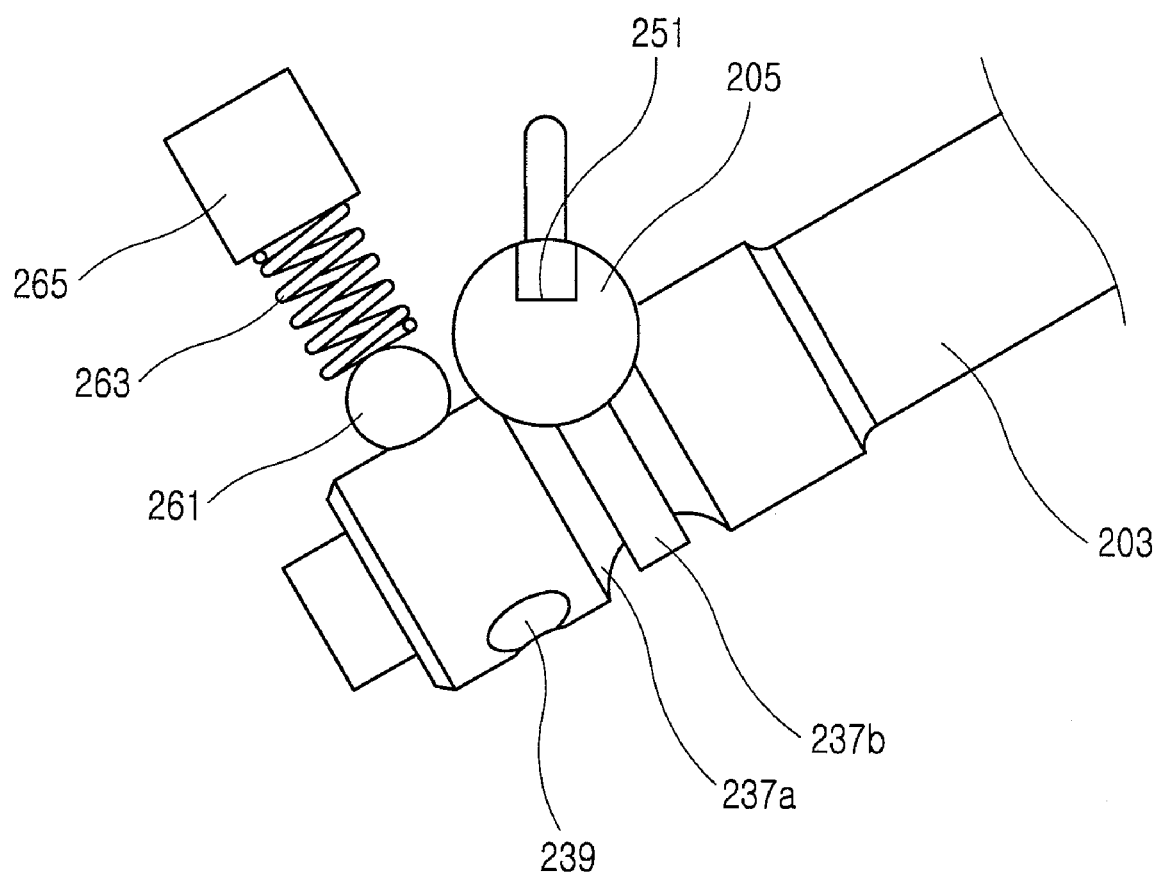
FIG. 10 is a side view illustrating a part of the hinge apparatus of FIG. 9.
Figure 11:
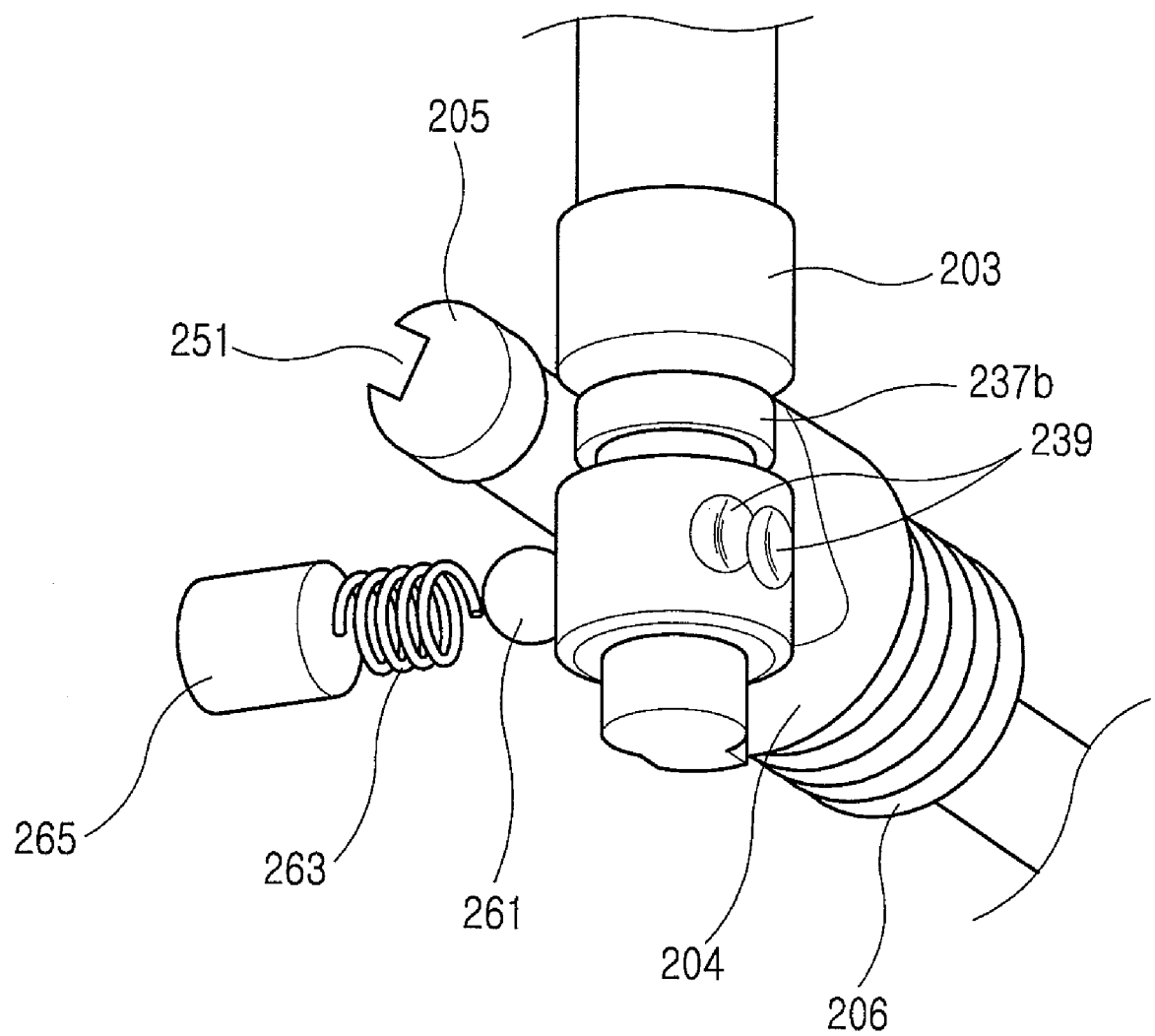
FIG. 11 is a perspective view illustrating a part of the hinge apparatus of FIG. 9.

FIGS. 9 to 11 illustrate a hinge apparatus 200 in a state that a second housing 102 is rotated about a first hinge axis A1 to be far from the first housing 101. When the second housing 102 is rotated about the first hinge axis A1 from the folded state onto the first housing 101, the flat portion 237c escapes from the state of contacting with the stopper slot 251 portion and moves along the outer circumferential surface of the first hinge shaft 205.

At this time, the first mountain-shaped protrusions 221 gradually escape from the valley-shaped portions 243 and gradually move toward the highest point of the second mountain-shaped protrusions 241. When the first mountain-shaped protrusions 221 escape from the valley-shaped portions 243, the second hinge cam 204 moves inwardly within the hole of the hinge housing 201, while the elastic member 206 provides the elastic force to the second hinge cam 204, which acts toward the first hinge cam 202. This elastic force of the elastic member 206 is converted into the driving force which causes the first mountain-shaped protrusions 221 to be rotated toward the engaged position with the valley-shaped portions 243 again. Consequently, the second housing 102 is also provided with the driving force which acts toward the direction along which the second housing 102 is folded onto the first housing 101.

When the second housing 102 is continuously rotated to be away from the first housing 101 such that the first mountain-shaped protrusions 221 go beyond the highest point of the second mountain-shaped protrusion 241, the driving force of the hinge apparatus 200 acts toward the direction along which the second housing 102 is away from the first housing 101.

That is, during the rotation of the second housing 102 about the first hinge axis A1, the elastic force acts as the driving force which causes the second housing 102 to be folded onto the first housing 101 when the second housing 102 is within an angle range with respect to the first housing 101 and the driving force which causes the second housing 102 to be away from the first housing 101 when out of the angle range, respectively.

When the second housing 102 is rotated about the first hinge axis A1 to reach an angle of about 155 or 170 degrees, the first and second stopper protrusions 219 and 229 are interfered with each other, thereby causing the second housing 102 to be stopped. The angle at which the second housing 102 stops may be variously configured, and thus those skilled in the art will configure it appropriate to a sort of product.

While the second housing 102 is rotated about the first hinge axis A1, the ball 261 is engaged with the second stopper recess and the stopper rib 237b is in contact with the outer circumferential surface of the first hinge shaft 205, thereby preventing the second housing 102 from rotating about the second hinge axis A2.

Figure 12:
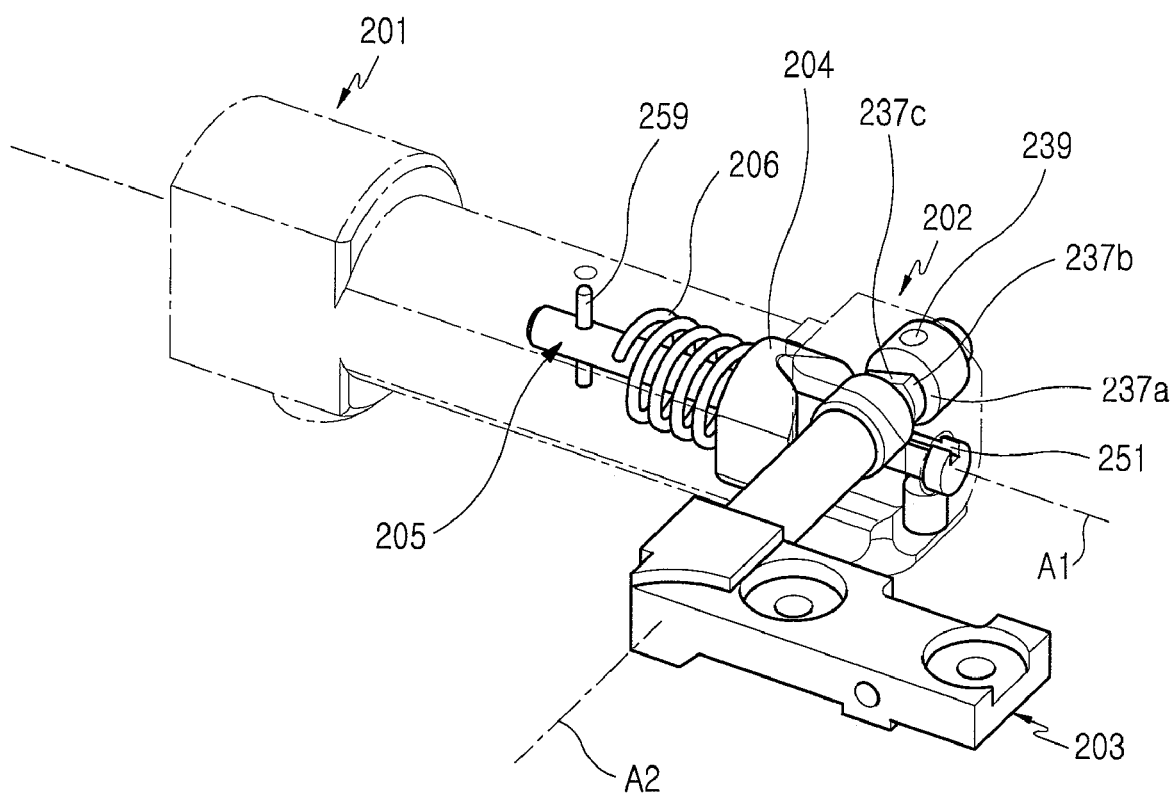
FIG. 12 is a partially transparent perspective view illustrating the hinge apparatus of FIG. 5 in a state that a second hinge shaft is rotated.
Figure 13:
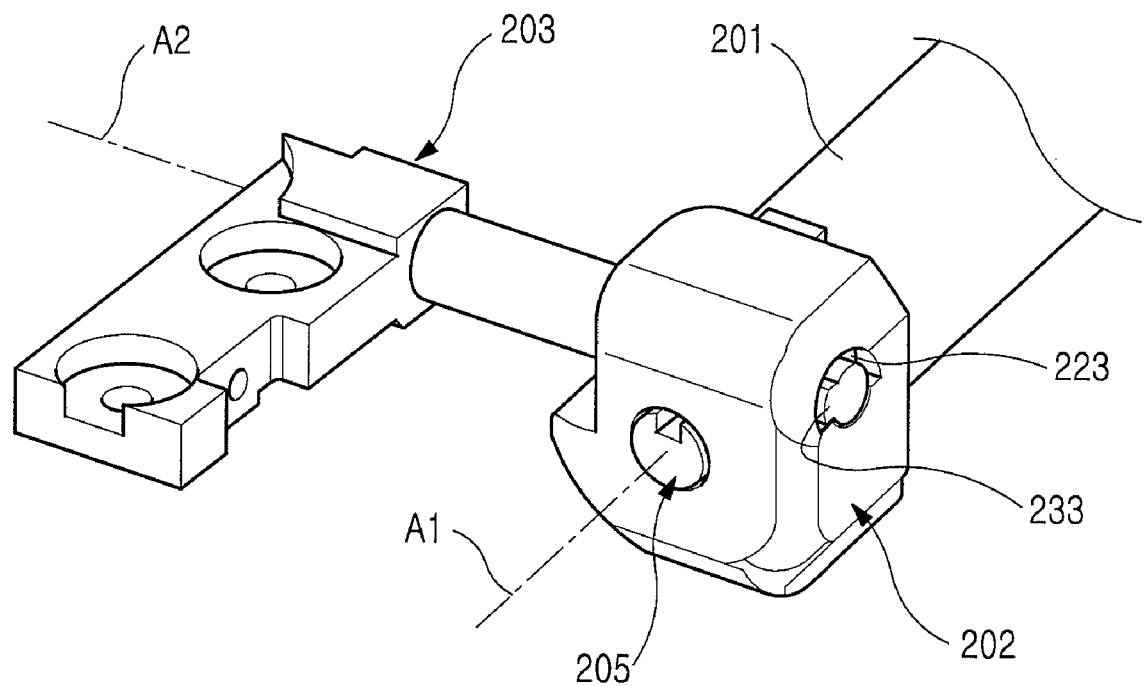
FIG. 13 is a perspective view illustrating a part of the hinge apparatus of FIG. 12 shown from another direction.
Figure 14:
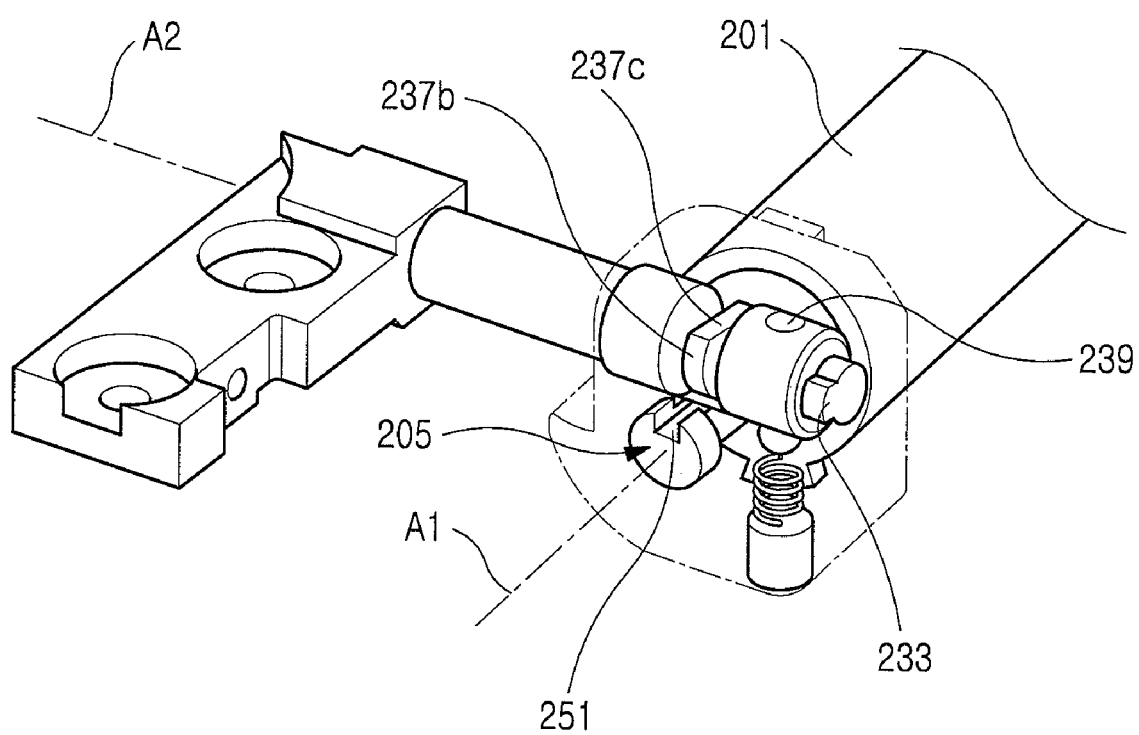
FIG. 14 is a partially transparent perspective view illustrating a part of the apparatus of FIG. 12.

FIGS. 12 to 14 illustrate a hinge apparatus 200 in a state that a second housing 102 is rotated about a second hinge axis A2 to be far from a first housing 101.

When the second housing 102 is rotated about the second hinge axis A2 to be away from the first housing 101, the ball 261 escapes from the second stopper recess and rubs against the outer circumferential surface of the second hinge shaft 203, and the stopper rib 237b is inserted into the stopper slot 251.

Since the stopper rib 237b is inserted into and engaged with the stopper slot 251, the second housing 102 may not be rotated about the first hinge axis A1. Namely, the second housing 102 is prevented from rotating about the first hinge axis A1 while rotating about the second hinge axis A2.

When the second housing 102 is rotated about the second hinge axis A2 to reach an angle of about 150 or 175 degrees with respect to the first housing 101, the ball 261 is engaged with one of the first stopper recesses 239. Accordingly, users may stop the second housing 102 at an angle according to a type of service, such as a multimedia service, games, etc., or use situations, such as in walking, indoor space, etc.

Meanwhile, when the second housing 102 is rotated about the second hinge axis A2 to be unfolded at an angle of about 175 degrees with respect to the first housing 101, the third stopper protrusion 233 of the second hinge shaft 203 is stopped by the wall of one end portion of the guide groove 223. Accordingly, it is not possible that the second housing 102 is rotated more than the angle of about 175 degrees with respect to the first housing 101. Of course, it may be easily contemplated that the angle range of the rotation of the second housing 102 about the second hinge axis A2 may be variously changed according to the position of the wall of one end portion of the guide groove 223.

As described above, the portable terminal with the hinge apparatus according to an exemplary embodiment of the present invention has an advantage that the portable terminal of the present invention is conveniently used for a normal communication as well as multimedia services such as watching broadcast according to the open direction of the second hinge housing. In addition, since the portable terminal with the hinge apparatus according to an exemplary embodiment of the present invention is openable in two directions, it provides users with improved convenience.

Also, since the second hinge shaft has the coupling piece as an integral structure therewith at the first end portion thereof and the stopper groove at the second end portion, it is easy that the second hinge shaft is coupled with the first hinge shaft.

In addition, since when the second housing has been rotated about one of the first and second hinge axis, the second housing is restricted from rotating about the other hinge axis, and therefore improved structural stability of the portable terminal may be obtained.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
   a first housing;
   a second housing pivotally coupled to the first housing so that the second housing can be unfolded from and folded onto the first housing; and
   a hinge apparatus for providing a first hinge axis and a second hinge axis perpendicular to each other and for coupling the first housing and the second housing together,
   wherein the hinge apparatus comprises:
      a first hinge shaft coupled to the first housing along the first hinge axis;
      a second hinge shaft coupled to the second housing along the second hinge axis and rotating about the first hinge axis and the second hinge axis;
      a stopper slot formed on an outer circumferential surface of the first hinge shaft along the first hinge axis;

a stopper groove formed on the second hinge shaft along a circumference thereof and encompassing a part of the outer circumferential surface of the first hinge shaft; and a stopper rib formed within the stopper groove and selectively engaging with the stopper slot, wherein when the second housing is rotated about the first hinge axis to be unfolded, the stopper rib interferes with the outer circumferential surface of the first hinge shaft, thereby restricting the second housing from rotating about the second hinge axis, and wherein when the second housing is rotated about the second hinge axis to be unfolded, the stopper rib is engaged with the stopper slot, thereby restricting the second housing from rotating about the first hinge axis.

2. The portable terminal as claimed in claim 1, wherein the hinge apparatus further comprises:

a hinge housing coupled to the first housing; and a first hinge cam coupled to the second housing, wherein the first hinge shaft is disposed through the first hinge cam and fixed to the hinge housing, and the first hinge cam is supported by the first hinge shaft and thereby may rotate about the first hinge axis.

3. The portable terminal as claimed in claim 2, wherein the hinge apparatus further comprises a first hinge arm formed at one end portion of the first housing, wherein the hinge housing is assembled within the first hinge arm.

4. The portable terminal as claimed in claim 2, wherein the second hinge shaft is rotatably coupled to the first hinge cam, and thereby rotating about the second hinge axis.

5. The portable terminal as claimed in claim 4, the hinge apparatus further comprising a second hinge arm provided at one end portion of the second housing, wherein the second hinge arm is coupled with the first hinge cam and encompasses the first hinge cam, thereby rotating together with the first hinge cam about the first hinge axis.

6. The portable terminal as claimed in claim 5, wherein the second housing is coupled with the second hinge arm and rotated about the second hinge axis relative to the second hinge arm.

7. The portable terminal as claimed in claim 2, wherein the hinge apparatus further comprises a ball assembly accommodated in the first hinge cam, wherein the ball assembly presses the second hinge shaft.

8. The portable terminal as claimed in claim 7, wherein the ball assembly comprises:

at least one or more pair of the first stopper recesses formed on an outer circumferential surface of the second hinge shaft;

a metal ball accommodated in the first hinge cam; and a spring applying an elastic force to the metal ball, wherein the metal ball is engaged with one of the first stopper recesses when the second housing is rotated about the second hinge axis to be unfolded from a folded state on the first housing.

9. The portable terminal as claimed in claim 8, wherein the metal ball is engaged with one of the first stopper recesses when the second housing is rotated about the second hinge axis to be unfolded at an angle of about 150 to 175 degrees from the folded state on the first housing.

10. The portable terminal as claimed in claim 8, wherein the ball assembly further comprises a second stopper recess formed on the outer circumferential surface of the second hinge shaft, wherein the second stopper recess is engaged with the metal ball when the second housing is folded on the first housing.

11. The portable terminal as claimed in claim 2, wherein the hinge apparatus further comprises:

a fixing hole formed through the hinge housing;

a pin hole formed through the first hinge shaft; and a fixing pin fixed in the fixing hole, wherein the fixing pin is inserted through the pin hole and fixed at both end portions thereof in the fixing hole, thereby fixing the first hinge shaft to the hinge housing.

12. The portable terminal as claimed in claim 2, wherein the hinge apparatus further comprises:

a first stopper protrusion formed at an outer circumferential surface of one end portion of the hinge housing; and a second stopper protrusion formed at an outer circumferential surface of the first hinge cam, wherein when the second housing is rotated about the first hinge axis to be away from the first housing, the second stopper protrusion interferes with the first stopper protrusion and thereby stopping the second housing from rotating.

13. The portable terminal as claimed in claim 12, wherein the second stopper protrusion interferes with the first stopper protrusion when the second housing is rotated to be unfolded at an angle of about 155 to 165 degrees with respect to the first housing.

14. The portable terminal as claimed in claim 2, wherein the hinge apparatus further comprises:

a third stopper protrusion formed at the outer circumference of the first end portion of the first hinge shaft; and a guide groove formed on an outer circumferential surface of the first hinge cam, wherein the third stopper protrusion moves along the guide groove when the second housing is rotated about the second hinge axis, and interferes with an a wall of one end portion of the guide groove when the second housing is rotated about the second hinge axis to be unfolded at an angle of about 175 degrees with respect to the first housing.

15. The portable terminal as claimed in claim 2, wherein the hinge apparatus further comprises:

a second hinge cam accommodated in the hinge housing and in contact with the first hinge cam; and an elastic member accommodated in the hinge housing and providing an elastic force to cause the second hinge to contact and push the first hinge cam.

16. The portable terminal as claimed in claim 15, wherein the first hinge shaft is disposed sequentially through the first hinge cam, the second hinge cam and the elastic member, and is fixed at a first end thereof to the hinge housing.

17. The portable terminal as claimed in claim 15, wherein the hinge apparatus further comprises:

a pair of mountain-shaped protrusions protruded from one face of the first hinge cam; and a plurality of second mountain-shaped protrusions and valley-shaped portions formed on the second hinge cam, each of the plurality of the second mountain-shaped protrusions and the valley-shaped portions being alternatively disposed along a circumference of the second hinge cam, wherein a driving force is generated in response to the rotation of the second housing, the driving force causing the first hinge came to be rotated so that the first mountain-shaped protrusions are engaged with the valley shaped portions.

18. The portable terminal as claimed in claim 1, wherein the hinge apparatus further comprises a flat portion formed on an outer circumferential surface of the stopper rib, the flat portion having a shape of a cutaway plane, wherein the flat portion is rotated around the first hinge axis while being in contact with the outer circumferential surface of the first hinge shaft when the second housing is rotated about the first hinge axis.

19. The portable terminal as claimed in claim 1, wherein the hinge apparatus further comprises a coupling piece which extends from the outer circumferential surface of the second hinge shaft in a direction perpendicular to the second hinge axis and is fixed to the second housing within the second housing.

20. A hinge apparatus for a portable terminal, the hinge apparatus comprising:
- a first hinge shaft coupled to a first housing along a first hinge axis;
- a second hinge shaft coupled to a second housing along a second hinge axis and rotating about the first hinge axis and the second hinge axis;
- a stopper slot formed on an outer circumferential surface of the first hinge shaft along the first hinge axis;
- a stopper groove formed on the second hinge shaft along a circumference thereof and encompassing a part of the outer circumferential surface of the first hinge shaft; and
- a stopper rib formed within the stopper groove and selectively engaging with the stopper slot, wherein when the second housing is rotated about the first hinge axis to be unfolded, the stopper rib interferes with the outer circumferential surface of the first hinge shaft, thereby restricting the second housing from rotating about the second hinge axis, and wherein when the second housing is rotated about the second hinge axis to be unfolded, the stopper rib is engaged with the stopper slot, thereby restricting the second housing from rotating about the first hinge axis.

21. The hinge apparatus as claimed in claim 20, the hinge apparatus further comprising:
- a hinge housing coupled to the first housing;
- a first hinge cam coupled to the second housing;
- a flat portion formed on an outer circumferential surface of the stopper rib; and
- a coupling piece which extends from the outer circumferential surface of the second hinge shaft in a direction perpendicular to the second hinge axis and is fixed to the second housing within the second housing, wherein the first hinge shaft is disposed through the first hinge cam and fixed to the hinge housing, and the first hinge cam is supported by the first hinge shaft and thereby rotating about the first hinge axis, and wherein the flat portion is rotated around the first hinge axis while being in contact with the outer circumferential surface of the first hinge shaft when the second housing is rotated about the first hinge axis.

* * * * *